June 2, 1970     D. H. GILBERT     3,515,323
AUTOMOBILE LUGGAGE RACK

Filed Feb. 15, 1968     2 Sheets-Sheet 1

INVENTOR.
DALE H. GILBERT
BY Christie, Parker & Hale
ATTORNEYS

June 2, 1970 D. H. GILBERT 3,515,323
AUTOMOBILE LUGGAGE RACK
Filed Feb. 15, 1968 2 Sheets-Sheet 2
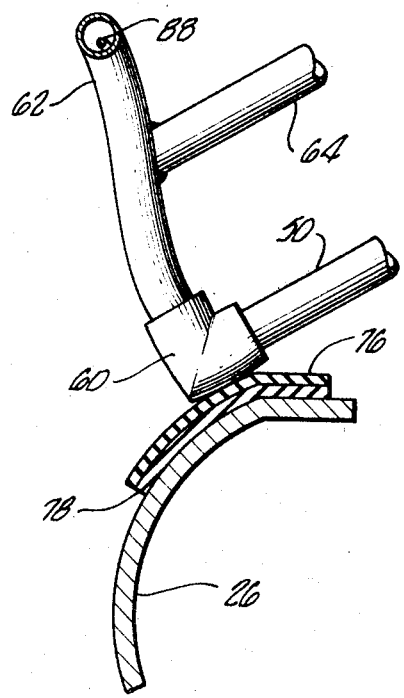
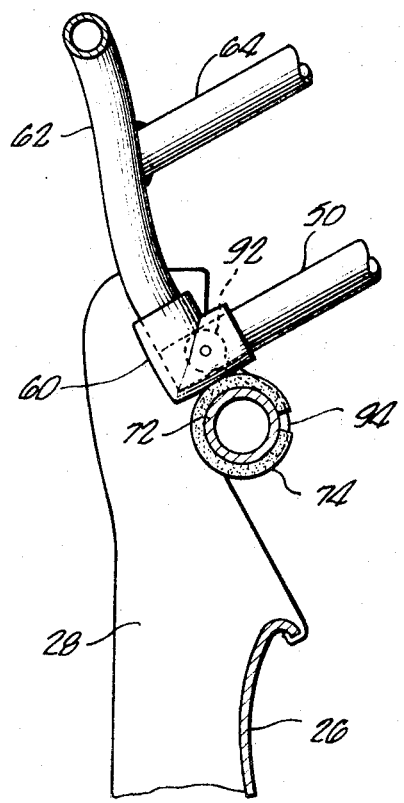
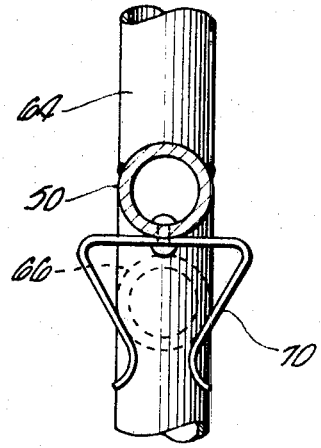
INVENTOR.
DALE H. GILBERT
BY
Christie, Parker & Hale
ATTORNEYS

United States Patent Office 3,515,323
Patented June 2, 1970

3,515,323
AUTOMOBILE LUGGAGE RACK
Dale H. Gilbert, 20505 Pioneer Blvd.,
Lakewood, Calif. 90712
Filed Feb. 15, 1968, Ser. No. 705,760
Int. Cl. B60r 9/00
U.S. Cl. 224—42.08                2 Claims

ABSTRACT OF THE DISCLOSURE

A normally inclined automobile luggage rack is secured at its upper end by mounting brackets mounted on the body of the automobile. The other end of the luggage rack is carried by a bumper of the automobile. The rack is pivotal from an inclined position to a substantially horizontal position to provide access to the part of the automobile normally covered by the rack when its rack is in the inclined position.

BACKGROUND OF THE INVENTION

Field of the invention

This invention relates to racks secured to automobiles for carrying articles on the exterior thereof. Although it is adapted for use with automobiles of various kinds it is especially well adapted for use on small, compact automobiles having steeply downwardly sloping lids adjacent their rear ends.

State of the prior art

For a number of reasons, the most prominent among which are their economy and maneuverability, small size passenger automobiles have become increasingly popular. A major disadvantage of these cars is their limited space. This is particularly noticeable on long trips where passengers carry a substantial amount of luggage or when the vehicle is used for carrying relatively long and bulky goods such as boards, for example. Frequently there is not enough space in the vehicle for carrying these articles.

A variety of luggage carrying devices for securing articles to the exterior of the vehicles are known in the prior art. The most common one is a roof carrier. It provides a basket secured to the roof of the vehicle and into which the articles can be placed. Such devices are not well adapted for use on compact automobiles which often have a rather limited power. At higher speeds the racks cause substantial air resistance and slow the vehicles considerably. Moreover, they elevate the center of gravity of the vehicle and make it top-heavy and somewhat difficult to maneuver. Even without such a roof carrier the stability of compact cars is often less than what is desirable.

Other prior art devices are shown, for example, in U.S. Pats. 3,203,605, 3,228,576, and 3,273,767. All of these devices are luggage carriers particularly adapted for use with a certain compact car known on the market as a "Volkswagen." The racks disclosed there are secured to the body of the vehicle and to its bumper. Some provide closed containers while others provide no more than a light support structure for carrying particular articles, such as a spare tire, for example.

Many of the luggage carriers are permanently mounted, thereby obstructing accessibility to a lid of the automobile adjacent the carrier which provides entrance to an interior portion of the vehicle such as its engine compartment. To open the lid the carriers must be removed. This is cumbersome and time consuming and generally disliked by the driving public. If this carrier is fully loaded, a person of considerable strength is required to lift it, or else it must be unloaded.

To alleviate some of these problems, the carrier shown in U.S. Pat. 3,273,767 is pivotally attached to the bumper and demountably secured to a portion of the body. When the lid is to be opened the carrier can be pivoted out of the way of the lid. The end of the carrier secured to the body is then supported by the pavement on which the vehicle parks. If it carries articles, they come into contact with the pavement and can become soiled or damaged. The open rack also takes up space immediately behind the lid, thereby limiting the access to the interior portions covered by the lid. If the lid covers a luggage trunk the opened rack makes it more difficult to load and unload articles therefrom. If the lid covers the vehicle engine, the open rack makes it difficult or impossible to reach the engine for minor repairs or a routine check.

SUMMARY OF THE INVENTION

This invention provides a rack for use on automobiles having a body with a front and a rear end, and a downwardly and outwardly sloping portion. The vehicle also includes a bumper adjacent the lower part of the sloping portion. The rack includes a support structure adjacent the sloping portion and adapted to retain articles placed thereon. Means adapted to be secured to the body adjacent an upper end of the rack secure the support structure to the body to be pivotal about a horizontal axis from an inclined, normal position to a horizontal, temporary position. Both the means and the support structure have a configuration whereby the weight of the structure and the articles on it bias the lower end of the rack toward and into engagement with the bumper. This is particularly important when the sloping portion is a lid or hood which covers the automobile engine, as in a Volkswagen. Preferably, the rack includes holding means for supporting the support structure in a substantially horizontal plane. When the structure is so disposed the sloping portion of the car body is freely accessible.

The mounting means preferably permit easy removal of the support structure therefrom if its use is not required and the vehicle is desired to be driven without the support structure.

If the support structure covers the license plate of the automobile, means are also provided for mounting the plate on the structure and illuminating it to comply with vehicle regulations.

The luggage rack of this invention and articles stored thereon are at all times supported by the automobile. There is no need to support the rack or the articles on the pavement when the rack is pivoted to the horizontal or temporary position, say, to permit opening of a lid.

The rack is compact, strong and economical to build. No part of the rack is supported by or rubs against portions of the automobile, such as its body, which can be damaged thereby. In addition, no weight is placed on doors or lids of the automobile which can overstress and damage hinges and locks. If the vehicle has its engine adjacent its rear end, the rack is spaced from the body and permits free circulation of the necessary air into the engine compartment and any air vents that might be provided.

BRIEF DESCRIPTION OF THE DRAWINGS

FIG. 4 is a fragmentary, cross-sectional view taken on line 4—4 of FIG. 1;

FIG. 5 is a view similar to that shown in FIG. 4 of another embodiment of this invention; and FIG. 6 is a fragmentary, cross-sectional view taken on line 6—6 of FIG. 2.

DESCRIPTION OF THE PREFERRED EMBODIMENTS

Figure 1:
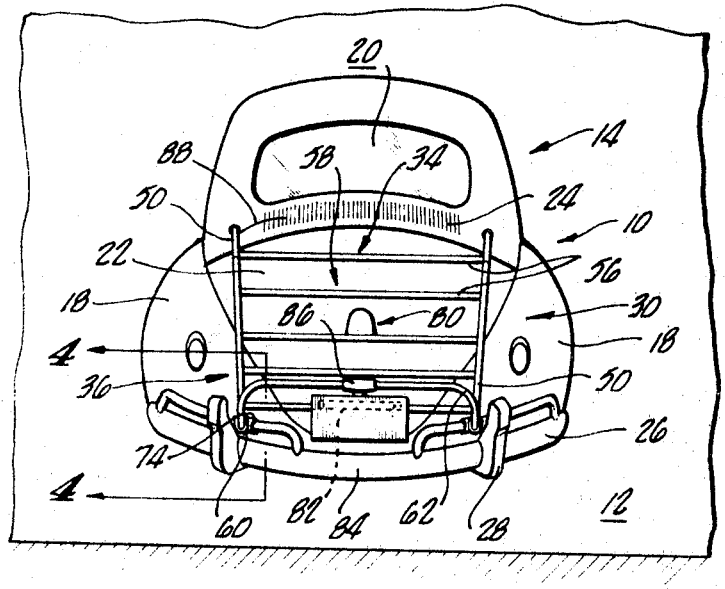
FIG. 1 is a rear elevational view of a luggage rack constructed in accordance with the present invention and mounted on an automobile.
Figure 2:
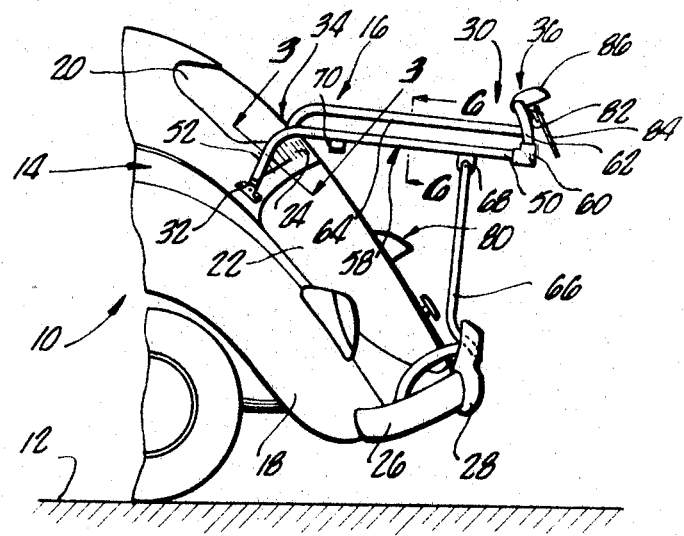
FIG. 2 is a side elevational view of the rack and automobile shown in FIG. 1 and shows the luggage rack in a substantially horizontal position.

Referring to FIGS. 1 and 2, an automobile 10 is parked on the ground 12 and includes a body 14 which, adjacent a rear end 16 of the automobile, slopes generally downward and outward. The body, adjacent the rear end, includes fenders 18 which define the outermost portions of the automobile. The rear end also includes a rear window 20 spaced generally upward from the fenders. A major portion of the central rear end of the automobile is defined by a lid 22 which extends over the width of the body between the fenders and which is hingedly attached to the remainder of the body downward of the window 20. An interior portion of the automobile covered by the lid may house the automobile enegine (not shown), in which case a portion of the body intermediate the window and the lid includes a plurality of laterally spaced air vents 24, or it may serve as a luggage compartment. A bumper 26 is secured to a frame (not shown) of the automobile by brackets (not shown) and can include vertically disposed spaced-apart bumper guards 28.

A luggage rack 30 is fitted to the automobile adjacent the downwardly sloping portion of the body between the window 20 and the bumper 26. A pair of mounting brackets 32 are secured to the body upwardly of lid 22 in the vicinity of but spaced inwardly from fenders 18 to mount an upper end 34 of the rack on the automobile. A lower end 36 of the rack is supported by the bumper 26. The weight of the rack, and of any article (not shown) thereon, urges the lower end of the rack into engagement with the bumper. Thus, the weight is carried solely by the mounting brackets 32 and the bumper 26.

Figure 3:
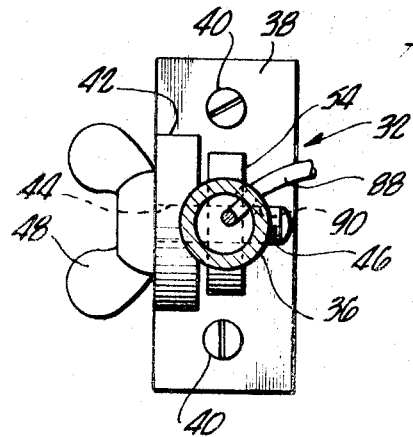
FIG. 3 is a fragmentary, cross-sectional view taken on line 3—3 of FIG. 2.

Referring to FIGS. 2 and 3, the mounting brackets each include a base 38 provided with spaced-apart apertures receiving a pair of threaded bolts 40 which extend through apertures (not shown) in the body 14 into the interior thereof. Nuts (not shown) on the interior of the body engage the threaded bolts and secure the bolts together with the mounting brackets to the body.

A lug 42 extends transversely away from an exterior side of the base 38. It includes a threaded aperture 44 which receives a threaded shaft 46 of a wing screw 48. The threaded shaft projects past the lug to engage a portion of the upper end of the rack and pivotally mount it on the automobile. The mounting brackets are positioned on the body such that the apertures in the lugs are aligned with each other to enable pivotal movements of the rack about the threaded shafts.

Referring again to FIGS. 1 and 2, the rack 30 includes a pair of laterally spaced side members 50 which include a bent portion 52 having a flattened and apertured end 54 (see also FIG. 3). The aperture in each flattened end is engaged by the threaded shaft 46 of the adjacent wing screw 48 and pivotally secures each side member to one of the mounting brackets 32. A plurality of cross bars 56 join the side members to each other and define a substantially planar article support structure 58 of the rack.

A lower end of each side member mounts an L-shaped connector 60. The connectors secure short legs of a substantially U-shaped lower guard 62 to the side members. A center portion of the U-shaped guard supports articles placed on the article support 58 of the rack and prevents them from sliding downwardly off the rack.

To prevent lateral movement of articles on the rack a side guard 64 is secured to each side members 50 and the lower guard 62. The side guards 64 extend from adjacent the bent portion 52 first transversely to and then substantially parallel but spaced apart from the side members to a portion of the short legs of the U-shaped lower guard intermediate the connector 60 and the center portion of the guard.

To provide the rack with ample strength, yet maintain it lightweight, the side members 50 as well as the cross bars 56 and the guards 62 and 64 are preferably constructed of tubular material such as metallic pipe. The connector 60 may then be a conventional pipe elbow and the remainder of the members of the rack are preferably welded together. If expedient, the lower guard 62 may, of course, be constructed integrally with the side members 50 or it may be welded thereto.

Particularly if the rack covers part or all of the lid 22, it must be pivoted into a temporary, substantially horizontal position, as shown in FIG. 2, to provide access to the interior portion covered by the lid. A holder 66 is pivotally secured to at least one, but preferably to both side members 50 by a mounting bracket 68 secured to the side members in the vicinity of its lower end. The holder is an elongated bar and its free end has a configuration to enable its engagement with a lower portion of the automobile. If the bumper includes bumper guards 28, the lower portion of the holder may be Z shaped to extend into a hollow portion (not shown) of the guard to position the lower portion of the holder while the rack is in the temporary position. In the alternative (not shown) the lower end of the holder may be given a suitable configuration to engage another sufficiently strong portion of the automobile such as, for example, the bracket (not shown) mounted the bumper to the automobile frame. The lateral spacing of the side members 15 is such that when the holders 66 are in engagement with the bumper 26 they do not interfere with the pivotal movement of lid 22.

When the rack is in its normal or inclined position, spring clips 70, best seen in FIG. 6, engages the holders 66 and retain them in a position parallel to the adjacent side member 50. The clips are secured to the side members 50 intermediate the mounting brackets 68 and the bent portions 52.

Referring to FIG. 4, a portion of the bumper supporting the lower end 36 of the rack 30, as, for example, a tubular cross bar 72 forming part of the bumper, preferably includes a soft, resilient protective sleeve 74 wrapped around its periphery. The sleeve prevents metal-to-metal contact between the track and the bumper. Without the sleeve relative movements between the rack and the bumper can damage the surface finish of the parts.

Referring to FIG. 5, if the lower end of the rack rests directly on the bumper, a bracket 76, is secured to the rack, preferably the connector 60. The bracket has a cross-section complementary to that of the bumper and includes a soft padding 78 on its side facing the bumper to prevent metal-to-metal contact between the rack and the bumper.

If a license plate carrier 80 of the automobile is covered by the rack when it is in its normal position, the rack includes a license plate carrier 82 secured to the center portion of the U-shaped lower guard 62 to exhibit a license plate 84 while the rack is installed. A light assembly 86 is connected with the center portion of the lower guard or the licence plate carrier 82 to illuminate the license plate. An electric cable 88 is coupled with the light assembly and extends through an aperture (not shown) in the center portion of the lower guard adjacent the license plate carrier into the interior of the tubular guard. The cable is carried to one of the side members 50 and extends over the lengths of the side member to adjacent that member's flattened end 64. It projects through an aperture 90 and then guided into the interior of the automobile where it is coupled with a proper electric circuit (not shown) such that the light assembly illuminates the license plate when lights of the automobile are turned on. Although the electric cable may be secured to exterior portions of the rack 30 it is preferred to place it interiorly of the members of the rack to protect the cable from damage and enhance the appearance of the rack.

Turning to the use of the rack, it is installed on the automobile 10 by securing the mounting brackets 32 to the body 14 with the threaded bolts 40. The flattened ends 54 of the side members 50 are then placed adjacent the upwardly extending lugs 42 of the mounting brackets to align the threaded aperture 44 and the lug with the aperture in the flattened portion. The wing screw is threaded through the aperture 44 until its shaft 46 projects past the side of the flattened end 54 facing away from the lug. The rack is now ready for use. Its weight urges it towards the bumper 26 until the lower end of the side members, or the L-shaped connector 60, rests against the tubular sleeve 74 on the tubular cross bar 72 (see FIG. 4) or until the bracket 76 and the soft padding 78 secured thereto is supported by the bumper. Articles can be placed on the rack and suitable strapping (not shown) can be applied to them to firmly secure them to the rack.

Under most circumstances the weight of articles and the rack is sufficient to maintain contact between the lower end of the rack and the supporting bumper portion while the automobile is driven. To positively prevent disengagement between the lower end of the rack and the supporting bumper portion as, for example, when the moving automobile encounters rough and uneven surfaces, one or a pair of spring clips or hooks 92 can be pivotally secured to the lower end of the rack, preferably the L-shaped connectors 60. Arcuate ends 94 of the hooks engage the cross bar 72 or other suitable portions of the bumper to positively retain the rack adjacent the bumper and prevent it from pivoting about shaft 46 of wing screw 48 while the automobile is in motion. A lock (not shown) can moreover be incorporated in the hooks to prevent the unauthorized disengagement of the rack from the bumper. This simultaneously serves as a lock for the underlying lid 22 since it cannot be opened until the rack is in its temporary, substantially horizontal position.

If access to the interior portion of the automobile covered by lid 22 is required, the spring hooks 92, if present, are disengaged from the bumper and the rack is pivoted about the shafts 46 of the wing screws 48 until it is in its temporary, substantially horizontal position. The holders 66 are disengaged from the spring clips 70 and pivoted downwardly into a supporting engagement with the bumper 26. The rack is now retained in its temporary position by the holders. The underlying lid can be opened and, since the lateral spacing of the holders is sufficient to prevent their interference with the pivoting lid. Routine checks or minor repairs can be made without any interference from the luggage rack. After the lid has been closed the holders 66 are disengaged from the bumper and pivoted into engagement with the spring clips 70. The rack can now be lowered into its normal, inclined position in which its lower end is supported by the bumper.

If the luggage rack 30 is not required for carrying articles, it is quickly and simply removed by unthreading the wing screws 48 from the threaded apertures 44 in the lugs 42 of the mounting brackets 32. Upon disengagement of the threaded shafts 46 from the apertures in the ends 50 of the side members the rack is freely removable.

To facilitate the removal of the rack, a suitable plug (not shown) is secured to the electric cable 88 to enable its quick disconnection with the electric circuit of the automobile. While the rack is removed, the mounting brackets 32 can remain permanently on the body 16 since they are relatively small and do not distract from the appearance of the vehicle.

This luggage rack is particularly well adapted for use with compact automobiles having steeply downwardly sloping rear ends. One such vehicle is the above referred to "Volkswagen" with which the rack is shown in the drawings. However, this rack can be used with a large variety of different automobile makes and models and its usefulness is not limited to the so-called "Volkswagen." As used in this application the term vehicle, automobile, car, etc. is intended and does include vehicles of any type and configuration with which a rack constructed in accordance with the present invention can be used.

I claim:

1. A luggage rack for use on automobiles having a body, a rear end, a pivotable lid adjacent the rear end providing access to an interior portion of the automobile, and a bumper adjacent the rear end, the rack comprising:
    (a) mounting means adapted to be secured to the body adjacent the lid;
    (b) a substantially flat article support structure spaced from the lid and having an end demountably and pivotally secured to the mounting means and means adjacent another end and sides of the support structure for retaining articles thereon when the rack is inclined from a horizontal plane, the structure being sufficiently long for the other end to be supported by the bumper when the mounting means are secured to the body;
    (c) holding means for maintaining the support structure in a substantially horizontal position, the holding means being positioned to permit pivotal opening of the lid;
    (d) means for mounting an automobile license plate in the rack so that the plate is visible when articles are loaded on the rack;
    (e) means for illuminating the license plate mounted on the license plate mounting means; and
    (f) an electric conductor coupling the illuminating means with an electric circuit of the automobile, the support structure being constructed of tubular members and a portion of the electric conductor being concealed in interior portions of the tubular members.

2. A rack according to claim 1 including latching means for connecting the other end of the structure to the bumper to prevent pivotal movement of the structure about the mounting means.

References Cited

UNITED STATES PATENTS

| | | | |
|---|---|---|---|
| 2,338,955 | 1/1944 | Metcalf | 214—450 |
| 2,568,628 | 9/1951 | Herring | 214—450 |
| 2,777,727 | 1/1957 | Reilly | 224—29 XR |
| 3,202,332 | 8/1965 | Walker | 224—42.08 XR |
| 3,203,605 | 8/1965 | Karl | 224—42.07 XR |
| 3,228,576 | 1/1966 | Gaukel. | |
| 3,273,767 | 9/1966 | Moore | 224—42.01 |
| 3,325,027 | 6/1967 | Swanson | 214—450 |

FOREIGN PATENTS

| | | |
|---|---|---|
| 195,272 | 1/1958 | Austria. |
| 276,016 | 9/1951 | Switzerland. |

GERALD M. FORLENZA, Primary Examiner